June 1, 1943. C. M. WILLIAMS 2,320,902
ELECTRICAL APPARATUS
Filed July 19, 1940 2 Sheets-Sheet 1

WITNESSES:

INVENTOR
Carroll M. Williams.
BY
ATTORNEY

June 1, 1943.  C. M. WILLIAMS  2,320,902
ELECTRICAL APPARATUS
Filed July 19, 1940   2 Sheets-Sheet 2

WITNESSES:
Edward Michaels
F. V. Giolma

INVENTOR
Carroll M. Williams.
BY
ATTORNEY

Patented June 1, 1943

2,320,902

UNITED STATES PATENT OFFICE 2,320,902

ELECTRICAL APPARATUS

Carroll M. Williams, Swissvale, Pa., assignor to Westinghouse Electric & Manufacturing Company, East Pittsburgh, Pa., a corporation of Pennsylvania Application July 19, 1940, Serial No. 346,254

13 Claims. (Cl. 175—361)

My invention relates, generally, to electrical apparatus, and it has reference, in particular, to an enclosure for electrical apparatus having a relatively strong magnetic leakage flux.

Generally stated, it is an object of my invention to provide an enclosure of ferrous material for electrical apparatus having a relatively strong magnetic leakage flux which shall occupy a minimum of space without increasing the energy losses of the apparatus, and which is simple and inexpensive to manufacture.

More specifically, it is an object of my invention to provide for reducing the clearances between the portions of a metal enclosure and electrical apparatus contained therein, having a relatively strong magnetic leakage flux, without increasing the losses due to heating caused by eddy currents induced in the enclosure structure.

Another object of my invention is to provide a frame construction for a reactor housing of such nature that the spacing between the windings of the reactor and the frame may be reduced to a minimum without increasing the heat losses due to eddy currents in the frame.

A further object of my invention is to provide for reducing the dimensions of a metal enclosure for electrical apparatus having a relatively high strength magnetic leakage flux by reducing the spacing between the enclosure structure and the apparatus and so constructing the enclosure as to increase the resistance to the flow of eddy currents, increase the reluctance of the leakage flux paths through the enclosure structure, and eliminate closed current paths through the structure.

A still further object of my invention is to provide for so positioning a plurality of ventilating louvers in a metal enclosure for a reactor as to provide a relatively high reluctance path for the leakage flux of the reactor.

Other objects will, in part, be obvious and will, in part, appear hereinafter.

In practicing my invention, a reactor, of the air core type may be provided with an enclosure of ferrous materials having a reduced spacing between the current carrying windings of the reactor and the ferrous portions of the enclosure without incurring excessive heating from hysteresis and eddy current losses in the different portions of the enclosure. The frame structure of the enclosure may comprise a plurality of angle members, each comprising a plurality of relatively thin angle sections positioned in nested relation to provide a laminated angle member, and connected together by means of insulating gusset members. The casing of the enclosure may comprise a plurality of relatively thin elongated sheet sections supported by the frame structure, and insulated from the frame structure and from each other. The sheet sections may be so positioned about the edges of the frame structure as to provide a laminated casing having central openings in the sides thereof. Doors having central openings therein may be provided on at least one side of the enclosure for giving access to the electrical apparatus therein. Suitable ventilating means such as louvers having a plurality of reentrant air paths may be positioned in the central openings of the sides and of the doors, the louvers on the sides being so positioned that the longitudinal axis of the slats or fins thereof is horizontal or transverse to the principal direction of the flux paths about the reactor.

For a more complete understanding of the nature and objects of my invention, reference may be had to the following detailed description and the accompanying drawings, in which.

Figure 1:
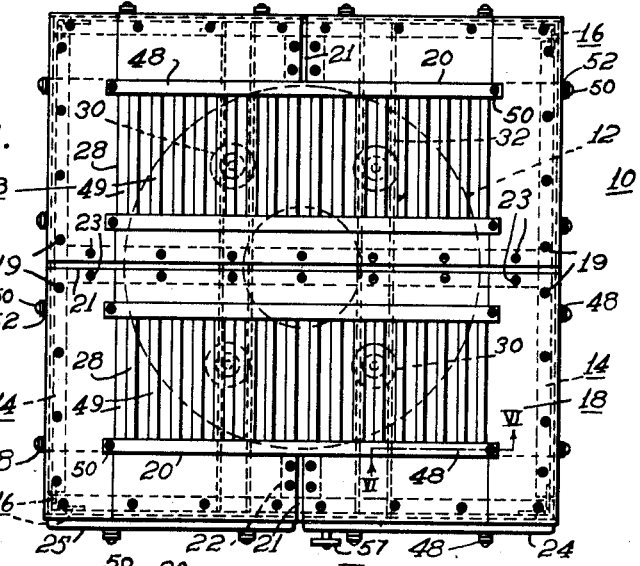
Figure 1 is a plan view of an enclosure embodying the principal features of my invention.
Figure 2:
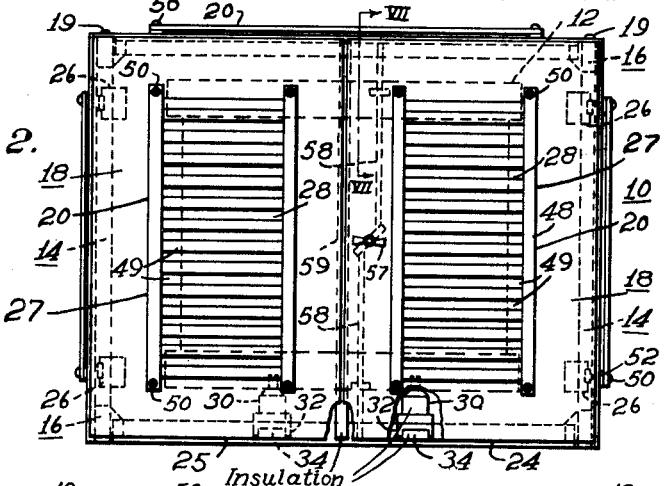
Fig. 2 is a front elevational view of the enclosure of Fig. 1.
Figure 3:
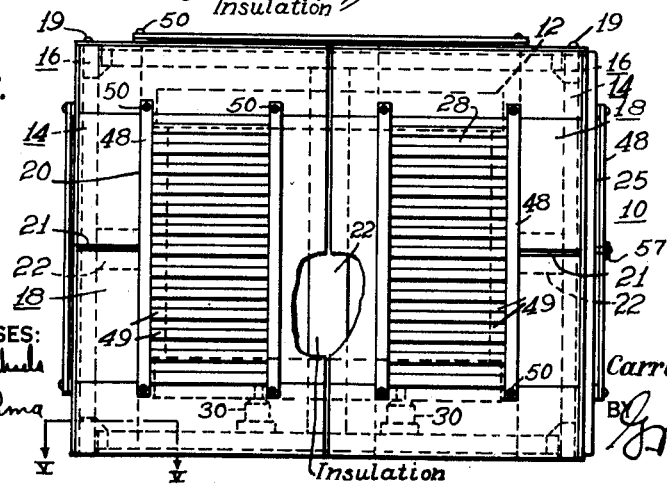
Fig. 3 is a side elevational view of the enclosure of Fig. 1.

Referring particularly to Figs. 1, 2 and 3, the reference numeral 10 may denote, generally, a metal enclosure for electrical apparatus having a relatively high strength magnetic leakage flux field, such as, for example, a reactor 12, which may be of the air core type. The enclosure 10 may comprise, generally, a frame structure comprising a plurality of angle members 14, which may be connected by means of insulating gusset members 16 to provide a substantially rigid frame structure. A suitable casing may be applied to the frame structure comprising, for example, a plurality of elongated panel sections 18 of relatively thin sheet steel which may be secured to the angle members 14 along the edges of the enclosure by suitable means, such as the bolts 19, which may be insulated therefrom, to provide substantially central openings 20 in the sides and top thereof. The panel sections 18 may be insulated from each other to interrupt any eddy current paths, having, for example, air gaps 21 therebetween, and insulating connecting members 22 secured thereacross by means of bolts 23 to mechanically join the sections together.

In order to give access to the reactor 12, doors 24 and 25 may be provided on one side of the enclosure, being for example, secured to the side angle members 14 by means of hinges 26. The doors 24 and 25 may also be provided with central openings 27, and suitable ventilating means such as the louvers 28, may be positioned therein, and in the openings 20 of the sides.

The reactor 12 may be supported in the enclosure 10 in any suitable manner, being for example, mounted therein by means of insulators 30 which may be secured to suitable support members such as the channel members 32. In order to prevent the members 32 from providing an electrical circuit between the front and back angle members 14 of the frame structure, the support members may be insulated therefrom by means of suitable insulation 34.

Figure 4:
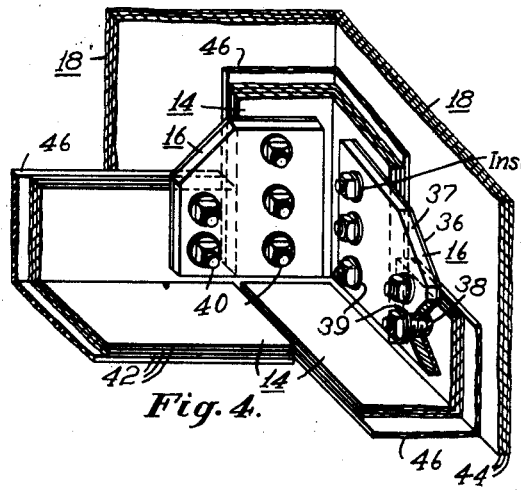
Fig. 4 is an enlarged isometric interior view, broken away in part, of the right-hand lower rear corner of the enclosure of Fig. 1, illustrating a method of joining the laminated frame members.

For the purpose of preventing the formation of electrical circuits for eddy currents which may be induced in the frame structure by means of the magnetic leakage flux of the reactor, the angle members 14 are preferably insulated from each other. Referring particularly to Fig. 4, it may be seen that the angle members 14 may be connected together by suitable gusset members 16 which not only provide a mechanical connection between the angle members, but also insulate them electrically from each other. For example, the gusset members 16 may comprise plates of suitable insulation 36 interposed between metal plates 37 and the angle members 14. Suitable insulation, such as insulating bushings 38 and washers 39, may be provided about bolts 40 which secure the angle members to the gusset members 16, so that the angle members 14 are electrically insulated from the metal plates 37 and from each other.

Figure 5:
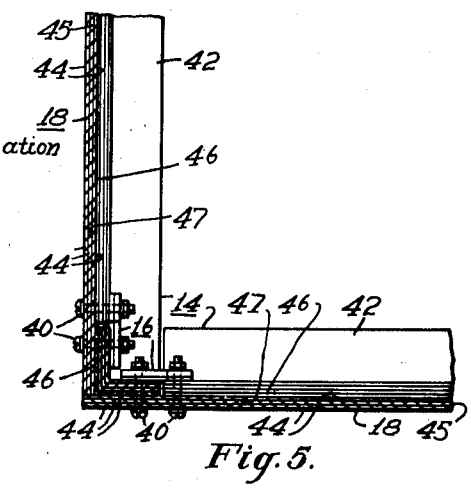
Fig. 5 is an enlarged sectional view taken along the lines V—V of Fig. 3.

In order to minimize the losses incurred by eddy currents induced in the metal portions of the enclosure 10 which are positioned in the magnetic flux leakage field of the reactor 12, the angle members 14 may comprise a plurality of relatively thin angle sections 42 positioned in nested relation as shown in Figs. 4 and 5, so as to provide an angle member 14 of laminated construction. The individual sections may be insulated from each other either by a coating of insulating varnish, or by providing an oxide coating or other suitable insulating film thereon. The angle members 14 may be formed of angle sections 42 of uniform size or width and the extending flange portions cut to provide a smooth and even edge such as shown, or they may be formed from angle sections of different widths, selected so that the edges thereof are even when the sections are assembled in nested relation, as shown.

The panel sections 18 of the casing may comprise a plurality of relatively thin elongated sheet members 44 and 45 positioned in stacked relation, or in layers, to provide a laminated casing, and thus minimize the heating caused by eddy currents induced therein by the magnetic leakage flux of the reactor, by increasing the resistance to the flow of current in the sections and reducing the voltages produced therein. As shown in Figs. 4 and 5, suitable insulation such as the strips 46, may be interposed between the panel sections 18 of the casing and the angle members 14 of the frame. The end portions of the sheet members 44 and 45 of the casing may be interleaved at the corners by making the members 45 shorter than the members 44, so that the end portions of the members 44 of one section overlap, or sandwich the member 44 of an adjoining section, while the member 45 of the one section butts against the members 44 of the adjoining section at the point 47 shown in Fig. 5, to provide a stronger and more integral structure. The members 44 and 45 may be provided with a film of insulation, such as a coating of varnish or other suitable insulating material to insulate them from each other.

Figure 6:
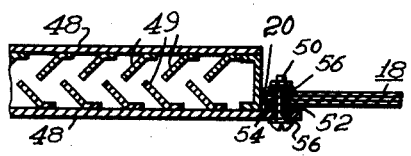
Fig. 6 is an enlarged sectional view taken along the lines VI—VI of Fig. 1.

Referring to Fig. 6 of the drawings, it may be seen that the ventilating louvers 28 may comprise a frame structure 48 having a plurality of relatively thin elongated fins or slats 49 secured therein in spaced and overlapping relation so as to provide a plurality of reentrant air paths therethrough. The ventilating louvers 28 may be mounted in the openings in the sides of the enclosure and in the doors in any suitable manner, being, for example, secured to the adjoining panel sections 18 of the casing or to the door frames by means of bolts 50.

In order to prevent the frames 48 of the ventilating louvers 27 from electrically connecting the different panel sections 18 of the casing, suitable insulating material 52 may be positioned between the frame 48 and the adjoining panel sections 18 of the casing, and suitable means, such as the insulating bushing 54 and the insulating washers 56 may be utilized in connection with the bolts 50 to completely insulate the frame 48 of the ventilating louvers from the adjoining sections of the enclosure.

Figure 7:
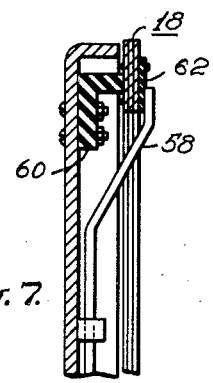
Fig. 7 is an enlarged sectional view along the line VII—VII of Fig. 2 showing the latching arrangement; and, Figs. 8 and 9 are diagrammatic side elevational and plan views, respectively, of the enclosure showing the principal paths of the magnetic leakage flux and the eddy currents induced in the different sections of the top of the enclosure.

Referring to Figs. 2 and 7, it may be seen that the doors 24 and 25 may be provided with a suitable latch device such as the handle 57 and reciprocating latch rods 58, which may be mounted on the door 24. Means such as the door strike 59, which may be of any suitable insulating material, may be secured to the edge of the door 25 so as to project therefrom and interlock with the door 24, to provide for securing the door 25 in the closed position. The doors may be insulated from the front angle members 14 by means of suitable insulation, such as the angle sections 60, which may be secured to the door frames so as to project slightly beyond the edges of the doors to engage the angle members 14. Suitable means, such as the insulation 62, may be interposed between the latch rods 58 of the door and the inner sides of the angle members 14 of the frame structure, to completely insulate the doors therefrom, and prevent the completion of an electrical circuit for any eddy currents between the side angle members 14 to which the doors 24 and 25 are secured, and the upper and lower angle members 14 of the frame structure.

Figure 8:
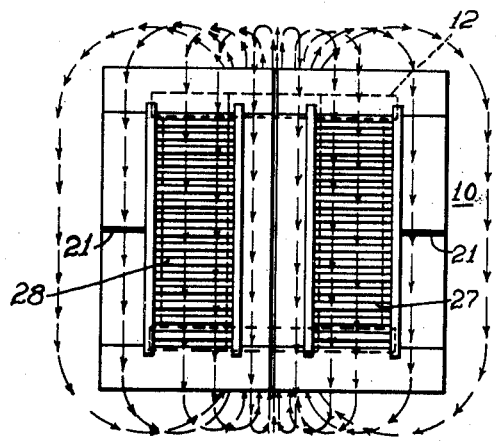

Referring particularly to Fig. 8 of the drawings, it will be seen that the ventilating louvers on the sides of the enclosure are situated directly in the path of the main magnetic leakage flux, shown by the arrows, which loops the conductors of the reactor 12 and the enclosure structure. Accordingly, it has been found highly beneficial in this instance to position the ventilating louvers 28 with the relatively thin slats or fins 49 thereof horizontal, and transverse to the direction of the main leakage flux in order to minimize the losses produced by heating from eddy currents therein.

By positioning the ventilating louvers so that the fins or slats thereof are substantially transverse to the direction of the main leakage path of the magnetic flux, the path of the flux is made to comprise a plurality of air gaps having only relatively thin metal sections interposed therein in spaced relation. Such a path amounts to substantially an air path, so that the reluctance of the path is maintained as near to a maximum as is possible.

Thus, even though the individual fins or slats may present a relatively wide area transverse to the direction of the magnetic field through which the flux passes, and in which differences of flux density induce voltages which cause eddy currents to flow therein, the density of the flux is maintained at a minimum by providing substantially an air path for the magnetic flux, and accordingly, the eddy currents produced in the individual fins or slats thereby are reduced to a minimum and are substantially negligible.

Since the fins or slats are in parallel relation, and the corresponding ends thereof are at the same voltages, there is no tendency for eddy currents to flow between the different fins or slats. The losses incurred by heating caused by eddy currents induced in the ventilating fins or slats when thus positioned, have been found to be much less than when the metal fins or slats are positioned with their longitudinal axes parallel to the main path of the leakage flux, in which case a plurality of parallel paths of ferrous material would be provided, so as to greatly increase the flux density.

Figure 9:
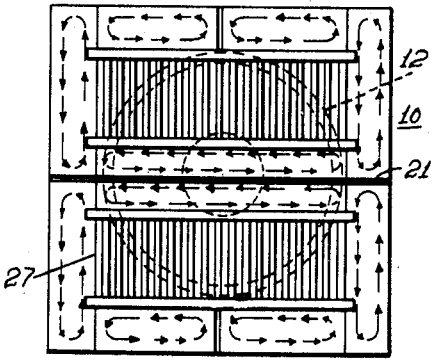

By making the casing of a plurality of sections which are electrically insulated from each other, the eddy current paths shown by the arrows in Fig. 9 may be effectively interrupted and the eddy currents limited to relatively small values, so that the losses due to eddy currents may be reduced to a minimum. Likewise, by laminating both the structural frame and the panel sections of the casing, and making the frame and casing of ferrous materials, the resistance of these members to the flow of any eddy currents induced therein may be effectively increased, thus further reducing the magnitude of the currents. At the same time, the reluctance of the paths for the magnetic leakage flux therethrough is maintained at a maximum, by providing relatively thin sections which readily saturate, and interposing air gaps therebetween, thus materially assisting in reducing the leakage flux density. The voltages available to produce eddy currents in these members are, accordingly reduced by laminating the members, thus also further assisting in the reduction of the losses caused by eddy currents circulating through the said members.

In view of the foregoing description it will be apparent that by utilizing a laminated and sectionalized frame structure and casing, I have provided an improved enclosure of ferrous materials for electrical apparatus having a relatively strong magnetic leakage field, which requires a minimum of spacing between the apparatus and the enclosure frame and the casing, and which does not thereby decrease the efficiency of the apparatus by causing increased eddy current and hysteresis losses. This feature is of great importance in indoor power plants and substations where space is at a premium and it is not always possible to provide the relatively large spaces between the apparatus and the enclosure frame and the casing necessary with the usual enclosures heretofore used. Since my improved enclosure may be constructed from standard sizes and shapes of sheet and strip steel, such as are readily obtainable, with only a minimum of operations thereon, enclosures embodying the principal features of my invention are simple and economical to manufacture.

Since certain changes may be made in the above description, and different embodiments of the invention may be made without departing from the spirit thereof, it is intended that all the matter contained in the above description or shown in the accompanying drawings, shall be considered as illustrative and not in a limiting sense.

I claim as my invention:

1. An enclosure for an air core reactor having a relatively high strength magnetic leakage flux comprising, a plurality of separate sections of sheet material, and a laminated frame structure of magnetic material positioned in the path of the leakage flux for supporting the sections of sheet material.

2. An enclosure for apparatus having a relatively high strength magnetic flux leakage field comprising, a plurality of relatively thin structural iron members positioned in side by side relation to provide laminated frame members having a relatively high impedance to the flow of eddy currents, and a plurality of sheet metal sections supported by the frame in stacked relation to provide a laminated metallic enclosure.

3. The combination with a reactor, of a laminated structural iron frame, a laminated sheet metal casing of magnetic material comprising a plurality of sections separately secured to the frame positioned about the edges of the frame to provide central openings, and a plurality of ventilating louvers supported in said openings by the said sections having fins positioned transversely to the direction of the main leakage flux to provide a high reluctance path therefor.

4. An enclosure for electrical apparatus having a relatively strong magnetic leakage flux comprising, a structural frame, a casing supported by the frame having a plurality of openings therein, and a plurality of ventilating devices positioned in the openings having frame structures with a plurality of longitudinal spaced apart fins of magnetic material so disposed that the fins are transverse to the principal path of the leakage flux whereby the leakage flux density is reduced.

5. The combination in a metal enclosure for a reactor, of a structural frame positioned about the reactor, a casing comprising a plurality of sections of relatively thin ferrous sheet material supported on the frame so as to provide substantially central openings in the sides of the enclosure, and a plurality of ventilating louvers comprising substantially rectangular frame structures having relatively thin slats of ferrous material in spaced relation and overlapping to provide reentrant air paths so positioned in the openings that the slats are substantially transverse to the principal leakage flux path whereby the reluctance of the leakage flux path is maintained at a relatively high value.

6. An enclosure for a reactor comprising, a plurality of laminated frame members of ferrous material, means connecting the frame members to form a frame structure and insulate them from each other, a plurality of sections of sheet steel supported on and insulated from the frame members to provide a laminated and sectionalized casing, and a plurality of metal ventilating louvers supported by and insulated from the casing.

7. A low loss metal enclosure for electrical apparatus having a relatively high strength magnetic flux leakage field comprising, a plurality of frame members, insulating means interposed between and connecting the frame members to provide a substantially rectangular frame structure, a plurality of elongated sheet sections positioned along and supported by the frame members adjacent the edges of the enclosure so as to provide substantially central openings in the sides of the enclosure, insulating means interposed between the said sections and the frame members, and a plurality of ventilating louvers secured in frames positioned in the openings and insulated from the said sections.

8. The combination in a metallic enclosure of magnetic material for an air core reactor, of a laminated structural iron frame, a plurality of elongated laminated sheet metal sections of ferrous material positioned along the frame and insulated therefrom and from each other to provide a plurality of central openings in the sides of the enclosure, and a door structure secured to at least one portion of the said frame structure and insulated from other portions thereof having a latch mechanism supported on the door and insulated from the frame structure.

9. A metallic enclosure for a reactor comprising, a plurality of angle frame members each comprising a plurality of relatively thin angle iron sections positioned in nested relation, insulating means interposed between the said frame members to provide a rigid sectionalized frame structure, a plurality of ferrous panel sections supported by the frame structure, and insulating means interposed between the panel sections and the frame structure.

10. A frame structure for electrical apparatus having a relatively high leakage reactance comprising, a plurality of angle frame members comprising a plurality of relatively thin angle members of ferrous material positioned in nested relation, and means connecting the angle frame members to provide a substantially rigid frame structure including insulation interposed between the said frame members.

11. The combination with electrical apparatus having a relatively high leakage reactance, of a substantially rigid frame structure, a plurality of relatively thin sheets of a magnetic material secured to the frame structure in stacked relation to minimize the eddy current losses caused by magnetic leakage fluxes from the apparatus, and insulation interposed between the said sheets and the frame structure.

12. A metallic enclosure for electrical apparatus having a relatively high density magnetic flux leakage field comprising, a structural frame comprising a plurality of angle members connected in insulated relation, a plurality of relatively narrow sections of sheet steel positioned along and supported by the frame on each side thereof overlapping at the corners and separated from each other so as to restrict the paths for eddy currents induced in the sections to localized areas, and insulating means interposed between the said sections and the frame.

13. An enclosure for an air core reactor comprising, a plurality of frame members, means connecting the frame members to provide a substantially rigid frame structure and insulate them from each other, a plurality of sections of relatively thin sheet steel supported by the frame members on each side of the frame structure in a plurality of layers and in interleaved relation and insulated from each other, and insulating means interposed between the frame members and the said sections.

CARROLL M. WILLIAMS.